WINFIELD S. HOUSTON.
Improvement in Hog Ringing Devices
No. 120,876.  Patented Nov. 14, 1871.
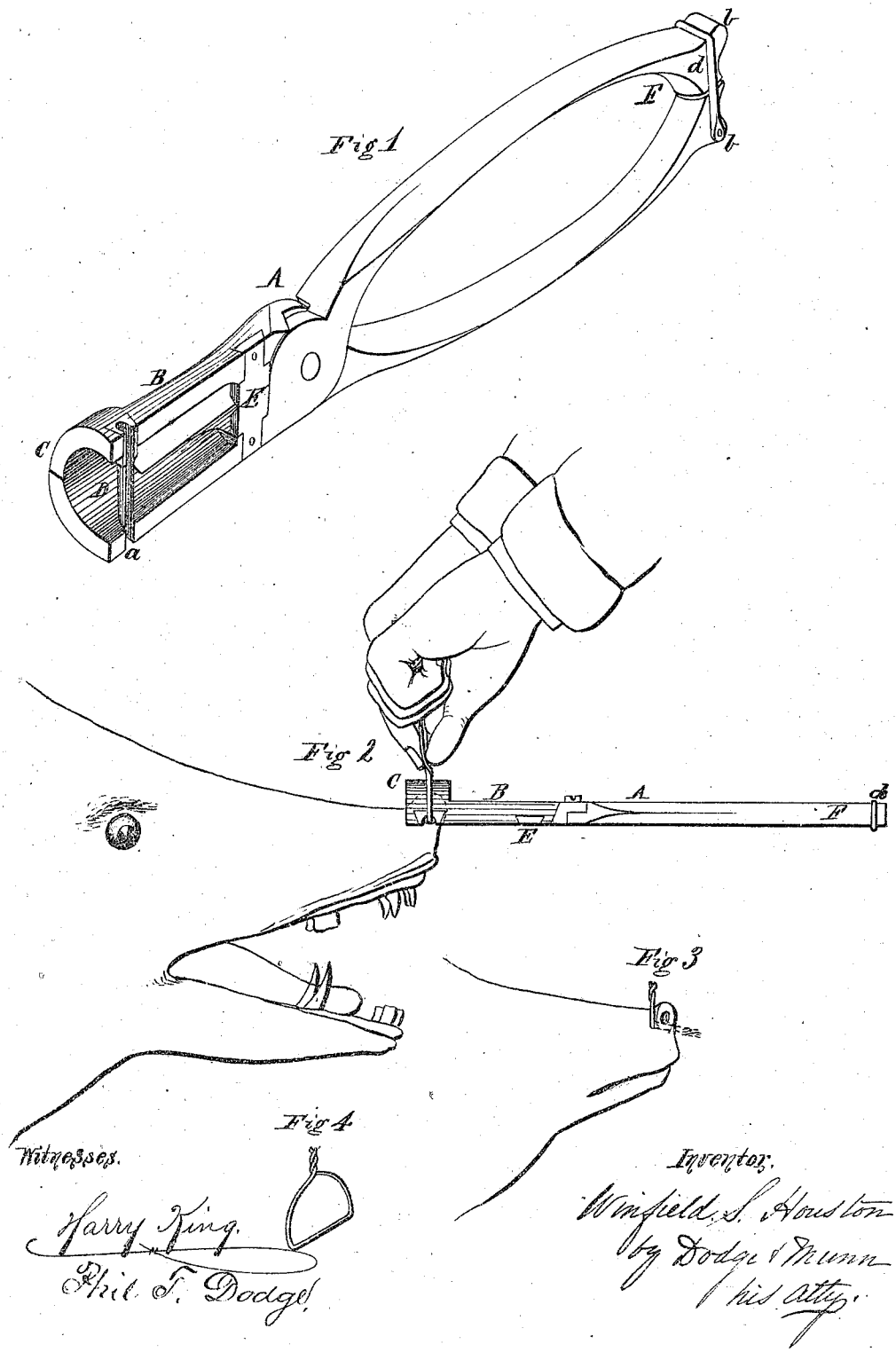

UNITED STATES PATENT OFFICE.

WINFIELD S. HOUSTON, OF MANSFIELD, OHIO.

IMPROVEMENT IN HOG-RINGING DEVICES.

Specification forming part of Letters Patent No. 120,876, dated November 14, 1871.

*To all whom it may concern:*

Be it known that I, WINFIELD S. HOUSTON, of Mansfield, in the county of Richland and State of Ohio, have invented certain Improvements in Hog-Ringing Devices, of which the following is a specification, reference being had to the accompanying drawing.

My invention relates to hog-ringing devices, and consists in the construction of a novel implement for inserting rings in the snouts of swine.

In the drawing, Figure 1 is a perspective view of my device or implement. Fig. 2 represents the method of applying it. Fig. 3 represents the snout of a hog with the ring inserted, and Fig. 4 is a perspective view of the form of the ring when inserted.

In most devices for ringing hogs provision is simply made for punching or cutting a hole through the snout. The wire for the ring has to be subsequently inserted, oftentimes with much difficulty, and always with much pain to the animal.

The object of this device is to enable the operator to cut the hole, insert the wire, bend it into the desired form, and secure it in place with very little trouble and in a very short time.

To accomplish this object I make my device A in the general form of a pair of pinchers or forceps. The jaws B are constructed with curved ends C on their upper side, so that when united they will form a semicircle, as clearly shown in Fig. 1, of sufficient size to fit upon the snout of an ordinary-sized hog. In the under side of one of the jaws is attached a semi-cylindrical blade or punch, D, of sufficient length to extend across and into a groove, *a*, in the opposite jaw, as shown in the same figure, the groove in the blade or punch being large enough to allow the free passage of the kind of wire ordinarily used for ringing swine. Near the inner ends of the jaws are attached a pair of cutting-blades, E, arranged so as to make a pair of wire-nippers, as is also shown in said Fig, 1. The ends of the handles F are provided with curved projections *b*, and to one of them is pivoted a loop of wire, *d*, or other suitable material, so that it can be engaged upon the other, and thus lock them together when desired.

In using the device thus constructed it is only necessary to open its jaws and place the semicircular portion of the same upon the snout of the animal; then close them and lock the handles by means of the wire loop. This done, the wire is then inserted through the semicircular punch and its ends drawn up over the curved portion of the jaws, as shown in Fig. 2, and then twisted, as clearly shown in Fig. 3. This ring is then turned back over the front end of the jaws, when the handles are unlocked, opened, and the device disengaged from the snout of the animal. The form of the ring thus made and left in place is clearly shown in Fig. 4. The wire-nipping blades forming a part of this device may now be used in trimming off the ends of the wire after being twisted together, or in cutting up the wire into suitable lengths for rings.

It will thus be seen that by the aid of this device rings may be easily and quickly inserted into the snouts of swine, with less difficulty to the operator and less injury to the animal than by any of the ordinary methods, as the semi-cylindrical punch-blade quickly makes the openings, allows of the ready insertion and fastening of the wire forming the ring, and the easy removal of the device when the ring is formed by the slipping of the wire out of the punch-blade.

Having thus described my invention, what I claim is—

1. A hog-ringing-device, consisting of a pair of forceps having the front ends of its jaws formed into a semicircle, C, and provided with a semi-cylindrical punch or blade, D, and the rear ends of the same with cutting-blades E, and also having its handles provided with a locking-loop, *d*, substantially as herein described.

2. The semicircular end C of the jaws B when closed, for the purpose of forming the wire ring thereon, when the same is in place upon the snout of the animal, as set forth.

3. The semi-cylindrical punch or blade D, in combination with the semicircular end of the jaws B, when constructed substantially as described, for the purpose of allowing the device to be disengaged from the ring, as set forth.

WINFIELD S. HOUSTON.

Witnesses:
ANDREW RICHEY,
JOHN D. POLUS.

(144)